(12) United States Patent
Sobel et al.

(10) Patent No.: US 8,584,234 B1
(45) Date of Patent: Nov. 12, 2013

(54) SECURE NETWORK CACHE CONTENT

(75) Inventors: William E. Sobel, Oak Park, CA (US);
Sourabh Satish, Foster City, CA (US)

(73) Assignee: Symantec Corporation, Mountain View, CA (US)

( * ) Notice: Subject to any disclaimer, the term of this patent is extended or adjusted under 35 U.S.C. 154(b) by 639 days.

(21) Appl. No.: 12/831,998

(22) Filed: Jul. 7, 2010

(51) Int. Cl.
*H04L 29/06* (2006.01)

(52) U.S. Cl.
USPC .......................................................... 726/22

(58) Field of Classification Search
None
See application file for complete search history.

(56) References Cited

U.S. PATENT DOCUMENTS

2007/0038637 A1* 2/2007 Taneja et al. .................... 707/10
2011/0099621 A1* 4/2011 Lizarraga et al. ............... 726/13

OTHER PUBLICATIONS

"Browser Cache Poisoning Using IE and Caching Servers," SecuriTeam, May 22, 2006 [Online] [Retrieved on Aug. 31, 2010] Retrieved from the Internet<URL:http://www.securiteam.com/securityreviews/5OP0M151KO.html>.
"Cache Poisoning," Fortify Software, Last Revision Apr. 23, 2009, [3 pages] [Retrieved on Aug. 6, 2010] Retrieved from the Internet<URL:http://www.owasp.org/index.php/Cache_Poisoning>.
"HTTP Cache Poisoning,"Posted Jun. 17, 2009, [6 pages] [Retrieved on Aug. 6, 2010] Retrieved from the Internet<URL:http://deadlytechnology.com/web-development/http-attack/>.

* cited by examiner

*Primary Examiner* — Gilberto Barron, Jr.
*Assistant Examiner* — Malcolm Cribbs
(74) *Attorney, Agent, or Firm* — Fenwick & West LLP

(57) ABSTRACT

A security module on a computing device applies security rules to examine content in a network cache and identify suspicious cache content. Cache content is identified as suspicious according to security rules, such as a rule determining whether the cache content is associated with modified-time set into the future, and a rule determining whether the cache content was created in a low-security environment. The security module may establish an out-of-band connection with the websites from which the cache content originated through a high security access network to receive responses from the websites, and use the responses to determine whether the cache content is suspicious cache content. Suspicious cache content is removed from the network cache to prevent the suspicious cache content from carrying out malicious activities.

19 Claims, 4 Drawing Sheets

SECURE NETWORK CACHE CONTENT

BACKGROUND

1. Field of Disclosure

The disclosure generally relates to the field of computer security, in particular to cache security.

2. Description of the Related Art

As the Internet becomes the predominant means of content distribution and network applications such as web browsers become key applications that enable interactions with many applications within enterprises or across enterprises, network applications are expected to perform faster than ever. Network caching (also called web caching, HTTP caching) is often used to give users a perception of faster network experience. Network caching reduces bandwidth usage, server load, and retrieving time by caching (storing) previously retrieved network content such as images, scripts, and web documents for later use.

Because network content retrieved by a computer may have been compromised, such compromised content may be stored in a network cache, thereby polluting the network cache (also called network cache poisoning). For example, a user may use a low-security network (e.g., a Hotspot Wi-Fi network provided by a café) to browse the Internet. A malicious party may hijack the low-security network and provide a maliciously constructed response to the user. The malicious party may cause the user's computer to cache the maliciously constructed response for a long time by manipulating the attributes of the maliciously constructed response (e.g., setting the Last-Modified HTTP header to a future time). By storing the maliciously constructed response in the network cache, the impact of the response is magnified because the user will continue to receive the malicious content until the cache entry is purged. Network cache poisoning is even more problematic when the poisoned network cache is used by multiple users.

Other than turning off the network caching all together, currently there is no security solution to the problem of network cache poisoning. Accordingly, there is a need for techniques that can detect suspicious network cache content and prevent the suspicious content from carrying out malicious activities.

SUMMARY

Embodiments of the present disclosure include methods (and corresponding systems and computer program products) for detecting suspicious network cache content and preventing the suspicious content from carrying out malicious activities.

One aspect of the present disclosure is a computer-implemented method for securing content in a network cache, comprising: monitoring a computing device associated with the network cache to detect a network activity performed by the computing device; responsive to the detection of the network activity performed by the computing device, examining content in the network cache to identify a piece of suspicious content in the network cache; and responsive to the identification of the piece of suspicious content in the network cache, preventing the piece of suspicious content in the network cache from carrying out malicious activities in the computing device.

Another aspect of the present disclosure is a computer system for securing content in a network cache, comprising: a non-transitory computer-readable storage medium storing executable computer program code, the computer program code comprising program code for: monitoring a computing device associated with the network cache to detect a network activity performed by the computing device; responsive to the detection of the network activity performed by the computing device, examining content in the network cache to identify a piece of suspicious content in the network cache; and responsive to the identification of the piece of suspicious content in the network cache, preventing the piece of suspicious content in the network cache from carrying out malicious activities in the computing device.

Still another aspect of the present disclosure is a non-transitory computer-readable storage medium encoded with executable computer program code for securing content in a network cache, the computer program code comprising program code for: monitoring a computing device associated with the network cache to detect a network activity performed by the computing device; responsive to the detection of the network activity performed by the computing device, examining content in the network cache to identify a piece of suspicious content in the network cache; and responsive to the identification of the piece of suspicious content in the network cache, preventing the piece of suspicious content in the network cache from carrying out malicious activities in the computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
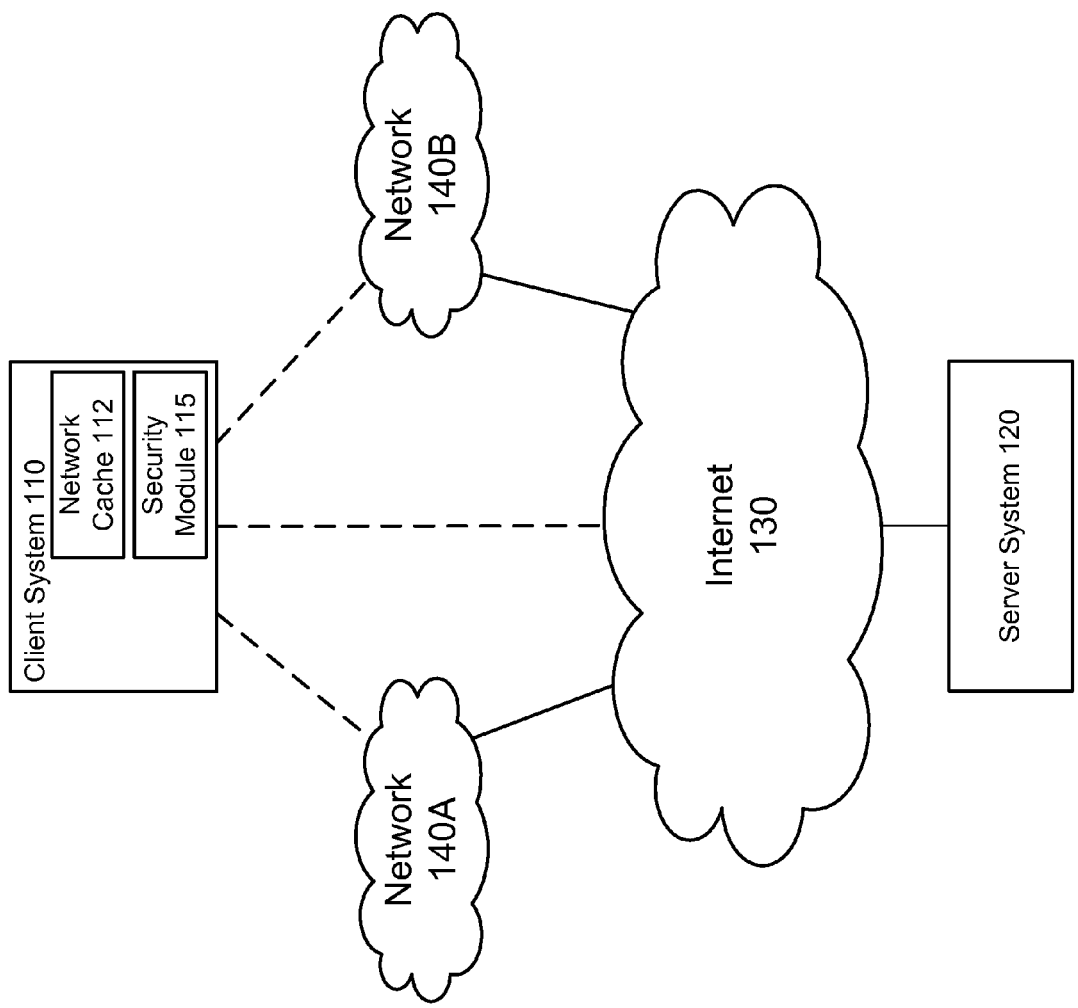
FIG. 1 is a high-level block diagram of a computing environment according to one embodiment of the present disclosure.

FIG. 1 is a high-level block diagram that illustrates a computing environment 100 for detecting suspicious content in a network cache and preventing the cached suspicious content from carrying out malicious activities, according to one embodiment of the present disclosure.

As shown, the computing environment 100 includes a client system 110 and a server system 120 connected through access networks 140A, 140B, and the Internet 130. Only one client system 110, one server system 120, and two access networks 140 are illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. Malicious software (or content) may be transmitted over the access network 140 and/or the Internet 130 to the client system 110 to be executed or processed on the client system 110.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements. Malware (also called malicious content and malicious programmatic content) may be inserted into scripting code such as JavaScript code, VBScript code, Flash code, Portable Document Format (PDF) code, PostScript code, to name a few. This code can be interpreted by running software such as a web browser or a specialized document rendering application (e.g., Adobe Reader), and carry out malicious activities by exploiting vulnerabilities in such software.

The client system 110 is connected to the Internet 130 through an access network 140. For example, the client system 110 may access the Internet 130 through low security or high security access networks 140. An example of a low security access network 140 is a free Wi-Fi hotspot provided by a café or a poorly-configured home network. An example of a high-security access network 140 is an enterprise network. The client system 110 can be portable (e.g., a laptop computer) and connect to different access networks 140 at different times. Because different access networks 140 may be subject to different security policies, communications the client system 110 makes through different access networks 140 may be subject to different security risks. Generally speaking, content received through a high security access network 140 is typically more trustworthy than content received through a low security access network 140 because communications made through the high security access network 140 typically are exposed to less security attacks comparing to communications made through the low security access network 140.

The client system 110 includes an endpoint network cache (also called the "network cache") 112. One example of the network cache 112 is a browser cache managed by a web browser application. The client system 110 utilizes the network cache 112 to enhance network communication efficiency, such as communication with the server system 120. Content (e.g., webpages, images, scripts) received by the client system 110 can be stored in the network cache 112. Subsequently, when a piece of content is needed, instead of retrieving the content from the server system 120, the client system 110 can retrieve the cached copy from the network cache 112, thereby reducing bandwidth usage, server load, and retrieving time.

Instead of (or in addition to) the endpoint network cache 112, the client system 110 may utilize other network caches, such as a proxy cache and a gateway cache to enhance communication efficiency. A proxy cache is a network cache sitting in an access network 140 that caches network traffic routing through the access network 140. A gateway cache is a surrogate cache used by a web server to make its site scalable and reliable. The figures and the following description illustrate detecting and removing suspicious content in an endpoint network cache 112. One skilled in the art will readily recognize alternate embodiments can be used to detect and invalid suspicious content in other types of network caches, such as the proxy caches and the gateway caches, without departing from the principles described herein.

The client system 110 executes a security module 115 for detecting suspicious content in the network cache 112 and preventing the suspicious cache content from carrying out malicious activities. The security module 115 can be, for example, incorporated into the browser application or the OS of the computer or part of a separate comprehensive security package, or loaded directly into a running program via programmatic extensions such as a plug-in or a control module. In one embodiment, the security module 115 is provided by a security system (e.g., a web-based system providing security software and/or services).

The security module 115 detects suspicious content in the network cache 112 by examining the cache content according to security policies, and selectively removes (purges) the suspicious content from the network cache 112. By purging the suspicious content from the network cache 112, the security module 115 prevents any maliciously-constructed content in the suspicious content from carrying out malicious activities.

The server system 120 is a hardware device and/or software program configured to provide content and/or services to the client system 110. An example of the server system 120 is a web-based system maintaining a collection of webpages on the Internet 130 (e.g., a website). The client system 110 can retrieve the webpages from the server system 120 by visiting the Uniform Resource Locators (URLs) associated with the webpages.

The Internet 130 is a system of interconnected computer networks that use standard communications technologies and/or protocols to facilitate data transmission among the computer networks. Thus, the Internet 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the Internet 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the Internet 130 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Computer Architecture

Figure 2:
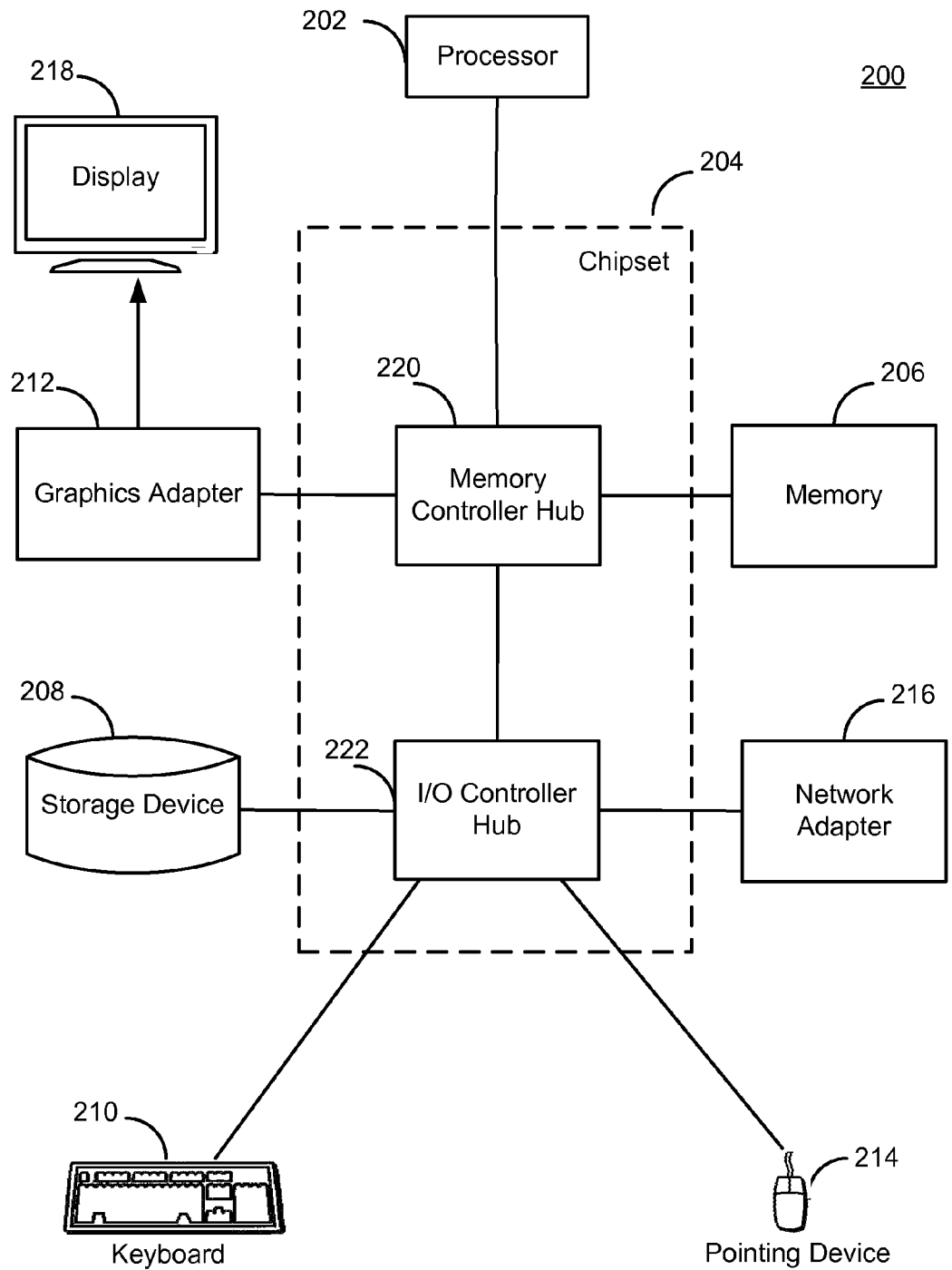
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security Module

Figure 3:
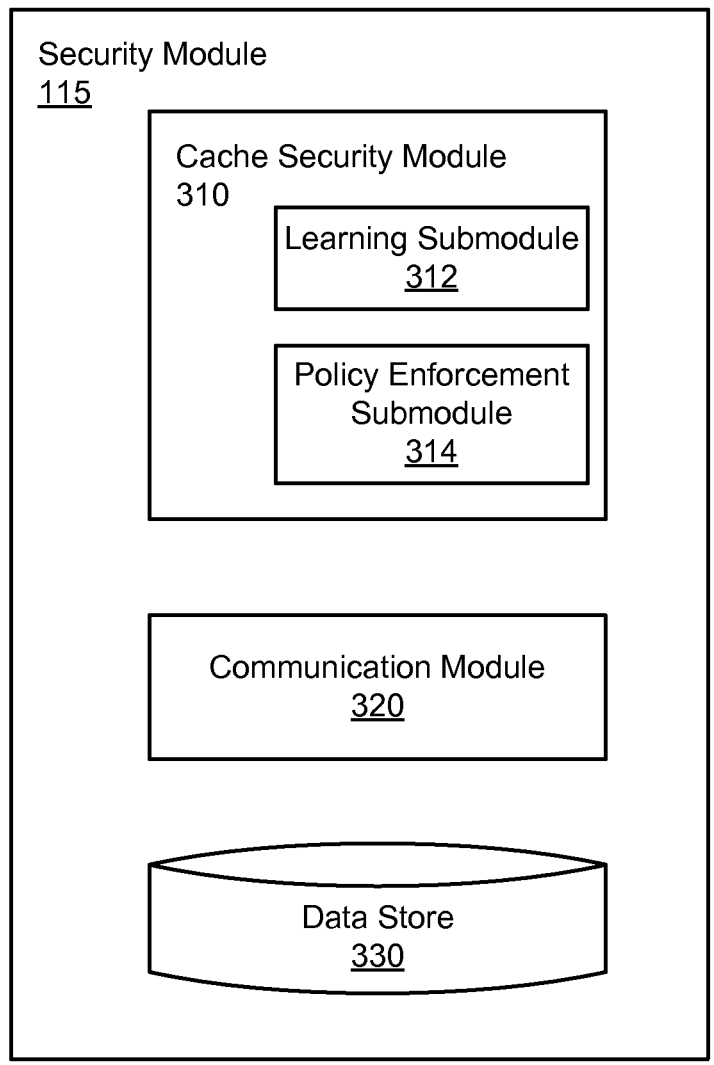
FIG. 3 is a high-level block diagram illustrating modules within a security module according to one embodiment of the present disclosure.

FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes a cache security module 310, a communication module 320, and a data store 330.

The cache security module 310 detects suspicious content in a network cache 112 and prevents the suspicious cache content from carrying out malicious activities. The cache security module 310 monitors network-related activities performed in the client system 110, such as HTTP requests and responses, network connection establishments and disconnections, and network cache activities (e.g., access, update, delete). As shown in FIG. 3, the cache security module 310 includes the learning submodule 312 and the policy enforcement submodule 314.

The learning submodule 312 learns the cache policies of websites visited by the user, and builds profiles for the websites based on their cache policies. A website administrator may choose different cache policies based on concerns such as server load, content sensitivity, network security, and user privacy. For example, the website of a financial institution may choose to disable network caching to enhance network security, while the website of a news provider may choose to enable network caching to accommodate more visitors using limited server capacity.

The learning submodule 312 can learn the website cache policies by studying responses from the websites. For example, if a response from a website contains an HTTP header field Pragma: no-cache or an HTTP header field Cache-Control: no-cache, then the learning submodule 312 determines that the website prohibits network caching for that response. As another example, if another response from another website contains the HTTP header fields Cache-Control: public and Expires: Mon, 22 Jul. 2010 11:12:01 GMT then the learning submodule 312 determines that the website's cache policy permits that response to be cached in public shared network caches until the expiration date. The learning submodule 312 creates a profile for each website and specifies the cache policies learned about the website in the profile.

In one embodiment, instead of learning the cache policies of a website by analyzing responses from the website, the learning submodule 312 may receive the cache policies from the website. For example, the learning submodule 312 may send a policy request to the website (e.g., an internal website or the website deploying a counterpart to the security module 115) and as a result the website returns its cache policies to the learning submodule 312. This communication may be made through a web browser in the client system 110 (also called in-band communication) or independent from the web browser (also called out-of-band communication).

The learning submodule 312 also learns the security policies of access networks 140 (e.g., the level of security provided by an access network) connected to the client system 110, and builds profiles for the access networks 140 based on their security policies. The learning submodule 312 may recognize an access network 140 based on an identifier associated with the access network 140 (e.g., a network identifier), or an identifier associated with a network device in the access network 140 (e.g., a Media Access Control (MAC) address of a network adapter). The learning submodule 312 may learn about the security policy of an access network 140 based on the Network Access Control (NAC) standard required by the access network 140 in order for the client system 110 to access resources in the access network 140. The learning submodule 312 creates a profile for each access network 140 and specifies the security policy learned about the access network 140 in the profile.

The policy enforcement submodule 314 enforces one or more security policies to prevent suspicious cache content from carrying out malicious activities on the client system 110. A security policy may be provided along with the security module 115 at installation, received from an external source such as a security server, or specified by the user. A security policy may be applicable to a particular access network 140 (e.g., an enterprise network 140), applicable to a type of access networks 140 (e.g., high security access networks 140), or generally applicable. For example, a security policy designed to prevent malware infection within an enterprise network is applicable only when the client system 110 is connected to the enterprise network.

Each security policy contains one or more security rules. A security rule is a piece of logic for the policy enforcement submodule 314 to detect suspicious content in the network cache 112 and/or to remove the suspicious cache content from the network cache 112. A security rule may take into account factors such as: the level of network security of the present/previous access network 140 connected to the client system 110, characteristics of the websites the cache content originated from, characteristics (or attributes) of the cache content, and characteristics of the client system 110 itself.

The following is an example security rule in plain English:

Purge any cache content whose response HTTP header "Last-Modified" was set at a future time.

To enforce this security rule, the policy enforcement submodule 314 examines entries in the network cache 112 to identify those associated with Last-Modified headers set sometime in the future, and purges those identified entries from the network cache 112. Because cache content by definition is created in the past, the last-modified time of the identified cache content was either mistakenly set or purposefully set to store the content in the network cache 112 for an extended period of time. Because a legitimate website is unlikely to set the last-modified time for its content to be in the future, the identified cache content may be constructed by a malicious party. By purging such suspicious cache content from the network cache 112, the policy enforcement submodule 314 forces the client system 110 (e.g., the web browser) to retrieve the content directly from the website, thereby preventing the suspicious cache content from carrying out malicious activities on the client system 110.

Another example security rule purges any cache content inconsistent with the cache policies of the website from with the cache content originates. For example, if the website profile specifies that scripts are prohibited from being cached, and a segment of JavaScript code from that website is in the network cache 112, the policy enforcement submodule 314 determines that the cached code segment is inconsistent with the website profile and removes the cached code segment from the network cache 112.

Another example security rule purges cache content received from a low security access network 140 (e.g., a home network 140) when the client system 110 connects to a high security access network 140 (e.g., an enterprise network 140). This security rule effectively prevents any cached malicious content transmitted to the client system 110 through the low security access network 140 from negatively impacting the high security environment. Instead of purging all such cache content, the security rule may selectively conduct an out-of-band communication with sensitive websites (e.g., websites listed in the web browser's trusted zone setting) to retrieve a copy of the cache content directly from the website using the high security access network 140, and replace the cached copy with the retrieved copy. Because the web browser generally applies looser security control to the sensitive websites (such that the websites can provide more functionalities to the user), malicious cache content associated with such websites may cause more damage. As a result of examining the cache content through separate out-of-band communication, the policy enforcement submodule 314 prevents such suspicious cache content from carrying out malicious activities on the client system 110.

A security rule may selectively purge certain types of cache content rather than indiscriminately removing all types of cache content. For example, instead of purging all cache content created while the client system 110 was connected to a low security access network 140, the client system 110 may selectively purge only content with high potential risk of causing harm, such as JavaScript code segments, and leave other types of cache content, such as images, in the network cache 112. As a result, the policy enforcement submodule 314 eliminates the high risk suspicious cache content while still preserving some performance improvements brought by the network cache 112. A security rule may also take into consideration other factors such as the security policy enforced in the client system 110. For example, the security rule may purge certain types of suspicious cache content (e.g., image content) if the anti-virus application is turned off or out-dated.

The policy enforcement submodule 314 enforces a security policy by examining content in the network cache 112 for content that violates a security rule in the security policy, identifying such content as suspicious, and purging the suspicious cache content from the network cache 112 to prevent it from carrying out malicious activities.

The communication module 320 communicates with security systems in access networks 140 to receive information about their network security policies. The communication module 320 also communicates with the server system 120 to receive content and information about its cache policy. These communications can be made in-band (e.g., made through a network application such as a web browser) or out-of-band (e.g., made independent from the web browser).

The data store 330 stores data used by the security module 115. Examples of such data include network/website profiles, information related to the network cache 112 (e.g., storage location), and information about the client system 110 (e.g., anti-virus protection level). The data store 330 may be a relational database or any other type of database.

Overview of Methodology for the Security Module

Figure 4:
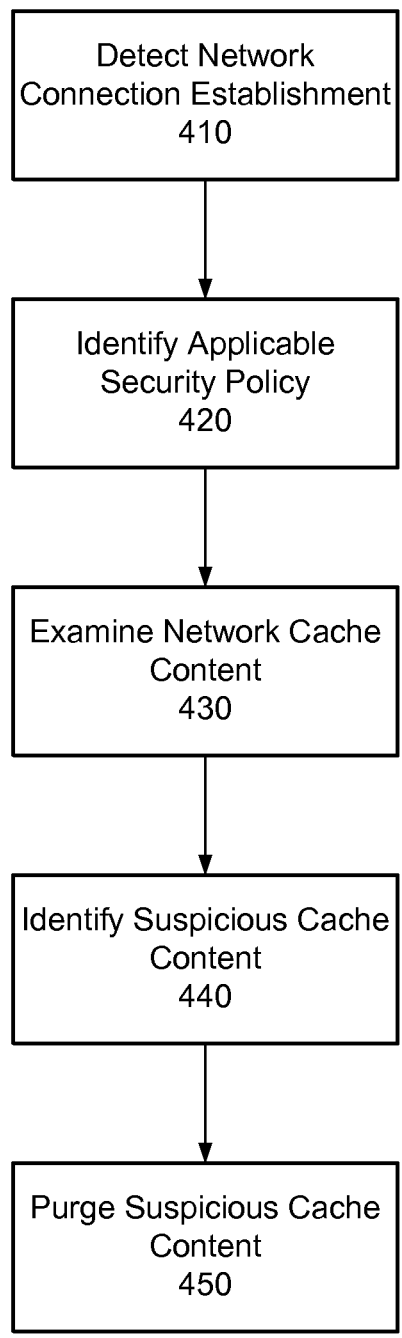
FIG. 4 is a flow diagram illustrating a process for detecting suspicious network cache content and preventing the suspicious content from carrying out malicious activities according to one embodiment of the present disclosure.

FIG. 4 is a flow diagram illustrating a process 400 for the security module 115 to detect suspicious cache content and prevent the suspicious cache content from carrying out malicious activities, according to one embodiment. Other embodiments can include different and/or additional steps than the ones described herein.

The security module 115 monitors network activities performed by the client system 110 and detects 410 a network connection establishment. In one embodiment, a network connection establishment occurs when the client system 110 becomes connected to an access network 140. In another embodiment, a network connection establishment occurs when the client system 110 accesses the Internet 130 through an access network 140 (e.g., requesting or receiving a response from a website).

In response to the detection of the network connection establishment, the security module 115 identifies 420 an applicable security policy including one or more security rules. The security module 115 examines 430 content in the network cache 112 for content that violates any of the security rules, and identifies 440 such content as suspicious cache content. The security module 115 removes (purges) 450 identified suspicious cache content according to the security rules to prevent the suspicious cache content from carrying out malicious activities in the client system 110.

Additional Embodiments

In one embodiment, the network cache 112 maintains multiple directories, each of which is designated to store cache content received through a particular access network 140. For example, content received from a home network 140 is stored in a home network cache directory, and content received from a work network 140 is stored in a work network cache directory. The security module 115 may apply a security rule to dynamically determine an active cache directory as the client system 110 is connected to different access networks 140. For example, when the client system 110 is connected to the home network, the security module 115 sets the home network cache directory as the active cache directory, and content stored in that directory is utilized (or prioritized). Subsequently when the client system 110 is connected to the work network, the security module 115 makes the work network cache directory as the active directory. As a result, the security module 115 beneficially isolates the impact of any potentially malicious cache content to the network environment from which the malicious content originates.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for securing network caches. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for securing content in a network cache, comprising:
    monitoring a computing device associated with the network cache to detect a network activity performed by the computing device, wherein the network activity comprises a network connection establishment with a computer network;
    responsive to the detection of the network activity performed by the computing device, examining content in the network cache to identify a piece of suspicious content in the network cache, the examining comprising:
        retrieving, through the established network connection, a response from a website from which a piece of cache content originated before the detected network connection establishment;
        comparing the piece of cache content with the response; and
        responsive to the piece of cache content not matching the response, identifying the piece of cache content as the piece of suspicious content in the network cache; and
    responsive to the identification of the piece of suspicious content in the network cache, preventing the piece of suspicious content in the network cache from carrying out malicious activities in the computing device.

2. The computer-implemented method of claim 1, wherein examining content in the network cache further comprises:
    determining that the website is a sensitive website subject to loose security control,
    wherein retrieving the response comprises retrieving, responsive to the determination that the website is a sensitive website subject to loose security control, the response from the sensitive website through an out-of-band communication using the established network connection.

3. The computer-implemented method of claim 1, wherein examining content in the network cache further comprises:
    examining the content in the cache for compliance with one or more security policies, wherein a piece of suspicious content in the cache is identified as suspicious responsive to non-compliance with a security policy.

4. The computer-implemented method of claim 3, wherein a security policy comprises a security rule, the security rule for determining whether a last-modified time of a piece of cache content is set to be in the future, wherein the piece of cache content is identified as suspicious responsive to having a last-modified time set in the future.

5. The computer-implemented method of claim 3, wherein a security policy comprises a security rule, the security rule for determining whether a piece of cache content is consistent with a cache policy associated with a website from which the piece of cache content originated, wherein the piece of cache content is identified as suspicious responsive to inconsistency with the cache policy associated with the website.

6. The computer-implemented method of claim 5, further comprising:
    learning the cache policy associated with the website by analyzing responses received from the website.

7. The computer-implemented method of claim 5, further comprising:
    receiving the cache policy associated with the website from the website.

8. The computer-implemented method of claim 1, wherein the network cache comprises at least one selected from an end-point network cache, a proxy cache, and a gateway cache.

9. The computer-implemented method of claim 1, wherein preventing the piece of suspicious content in the network cache from carrying out malicious activities in the computing device comprises removing the piece of suspicious content from the network cache.

10. The computer-implemented method of claim 9, wherein removing the piece of suspicious content from the network cache comprises selectively removing a piece of suspicious script code from the network cache.

11. The computer-implemented method of claim 1, wherein the network cache comprises a plurality of cache directories each of which comprising content received from a different computer network, wherein the computing device uses content stored in an active cache directory among the plurality of cache directories, and wherein preventing the piece of suspicious content in the network cache from carrying out malicious activities in the computing device comprises:
    making a cache directory that does not include the piece of suspicious content an active cache directory in the computing device.

12. A computer system for securing content in a network cache, comprising:
    a non-transitory computer-readable storage medium storing executable computer program code, the computer program code comprising program code for:
        monitoring a computing device associated with the network cache to detect a network activity performed by the computing device, wherein the network activity comprises a network connection establishment with a computer network;
        responsive to the detection of the network activity performed by the computing device, examining content in the network cache to identify a piece of suspicious content in the network cache, the examining comprising:
            retrieving, through the established network connection, a response from a website from which a piece of cache content originated before the detected network connection establishment;
            comparing the piece of cache content with the response; and
            responsive to the piece of cache content not matching the response, identifying the piece of cache content as the piece of suspicious content in the network cache; and
        responsive to the identification of the piece of suspicious content in the network cache, preventing the piece of suspicious content in the network cache from carrying out malicious activities in the computing device.

13. The computer system of claim 12, wherein examining content in the network cache further comprises:
    determining that the website is a sensitive website subject to loose security control,
    wherein retrieving the response comprises retrieving, responsive to the determination that the website is a sensitive website subject to loose security control, the response from the sensitive website through an out-of-band communication using the established network connection.

14. The computer system of claim 12, wherein examining content in the network cache further comprises:
    examining the content in the cache for compliance with one or more security policies, wherein a piece of suspicious content in the cache is identified as suspicious responsive to non-compliance with a security policy.

15. A non-transitory computer-readable storage medium encoded with executable computer program code for securing content in a network cache, the computer program code comprising program code for:
    monitoring a computing device associated with the network cache to detect a network activity performed by the computing device, wherein the network activity comprises a network connection establishment with a computer network;
    responsive to the detection of the network activity performed by the computing device, examining content in the network cache to identify a piece of suspicious content in the network cache, the examining comprising:
        retrieving, through the established network connection, a response from a website from which a piece of cache content originated before the detected network connection establishment;
        comparing the piece of cache content with the response; and
        responsive to the piece of cache content not matching the response, identifying the piece of cache content as the piece of suspicious content in the network cache; and
    responsive to the identification of the piece of suspicious content in the network cache, preventing the piece of suspicious content in the network cache from carrying out malicious activities in the computing device.

16. The non-transitory computer-readable storage medium of claim 15, wherein examining content in the network cache further comprises:
    determining that the website is a sensitive website subject to loose security control,
    wherein retrieving the response comprises retrieving, responsive to the determination that the website is a sensitive website subject to loose security control, the response from the sensitive website through an out-of-band communication using the established network connection.

17. The non-transitory computer-readable storage medium of claim 15, wherein examining content in the network cache further comprises:
    examining the content in the cache for compliance with one or more security policies, wherein a piece of suspicious content in the cache is identified as suspicious responsive to non-compliance with a security policy.

18. The computer system of claim 14, wherein a security policy comprises a security rule, the security rule for determining whether a last-modified time of a piece of cache content is set to be in the future, wherein the piece of cache content is identified as suspicious responsive to having a last-modified time set in the future.

19. The non-transitory computer-readable storage medium of claim 17, wherein a security policy comprises a security rule, the security rule for determining whether a last-modified time of a piece of cache content is set to be in the future, wherein the piece of cache content is identified as suspicious responsive to having a last-modified time set in the future.

* * * * *